United States Patent [19]

Machida et al.

[11] Patent Number: 5,050,051
[45] Date of Patent: Sep. 17, 1991

[54] AUTOMOBILE SIGNAL LAMP

[75] Inventors: Tsutomu Machida; Toshiyasu Mochizuki; Susumu Masuda, all of Shimizu, Japan

[73] Assignee: Koito Manufacturing Co., Ltd., Shizuoka, Japan

[21] Appl. No.: 471,578

[22] Filed: Jan. 26, 1990

[30] Foreign Application Priority Data

Jan. 31, 1989 [JP] Japan .................................. 1-22101

[51] Int. Cl.⁵ ............................................. B60Q 1/26
[52] U.S. Cl. .................................. 362/80.1; 362/268; 362/374; 362/368
[58] Field of Search .................. 302/61, 80, 80.1, 268, 302/336, 374, 375, 368

[56] References Cited

U.S. PATENT DOCUMENTS

| | | | |
|---|---|---|---|
| 4,575,782 | 3/1980 | Levine et al. | 362/61 |
| 4,652,979 | 3/1987 | Arima | 362/80.1 |
| 4,703,398 | 10/1987 | Huth et al. | 362/61 |
| 4,724,515 | 2/1988 | Matsuki et al. | 362/268 |
| 4,733,335 | 3/1988 | Serizawa et al. | 362/80 |
| 4,845,600 | 7/1989 | Matsumura et al. | 362/80 |
| 4,862,330 | 8/1989 | Machida et al. | 362/80 |
| 4,893,220 | 1/1990 | Kakidaira | 362/80.1 |
| 4,945,456 | 7/1990 | Kakidaira | 362/368 |
| 4,972,303 | 11/1990 | Machida et al. | 362/80 |

Primary Examiner—Ira S. Lazarus
Assistant Examiner—D. M. Cox
Attorney, Agent, or Firm—Sughrue, Mion, Zinn, Macpeak & Seas

[57] ABSTRACT

An automobile signal lamp being mounted on the inside of a rear window of an automobile and including a lens member, a body member and a light source member which is disposed in a space defined between the lens member and the body member. Connecting portions are integrally formed on respective lens member and the body member, and which portions cooperate in connecting the lens member with the body member.

12 Claims, 4 Drawing Sheets

AUTOMOBILE SIGNAL LAMP

FIELD OF THE INVENTION

The present invention relates to a signal lamp for use in a vehicle such as an automobile and the like and, particularly to the signal lamp mounted on the inside of a rear window of the vehicle.

DESCRIPTION OF PRIOR ART

Various proposals have been made with respect to an automobile signal lamp which usually comprises a lens member, a body member connected to the lens member, and a light source member disposed in a space defined between the lens member and the body member. The body member and the lens member have usually been connected together through screw threads, bonding, welding and the like.

In connecting the lens member with the body member by screw threads, it is required to prepare a number of separate parts such as screws, nuts and the like, which increases the number of parts and assembly time, thus increasing the cost.

In connecting the lens member with the body member by bonding, it is required to prepare an applicator for a bonding agent, and it is rather difficult to control the bonding agent.

In connecting the lens member with the body member by such as ultrasonic welding, the welding apparatus is excessively expensive.

In short, such connecting techniques have shortcomings that the number of parts is large, the assembling operation is time consuming and complicated, and manufacturing cost is expensive.

An object of the invention is to provide a novel signal lamp of an automobile overcoming the above described shortcomings.

SUMMARY OF THE INVENTION

According to the invention, there is provided a signal lamp being mounted on the inside of a rear window of an automobile and including a lens member, a body member and a light source member which is disposed in a space defined between the lens member and the body member, wherein the lens member and the body member respectively have connecting means which cooperate in connecting the lens member with the body member.

BRIEF DESCRIPTION OF THE DRAWINGS

Further objects and effects of the invention will become apparent from the following detailed description in conjunction with the drawings, in which.

DETAILED DESCRIPTION OF PREFERRED EMBODIMENTS

Figure 1:
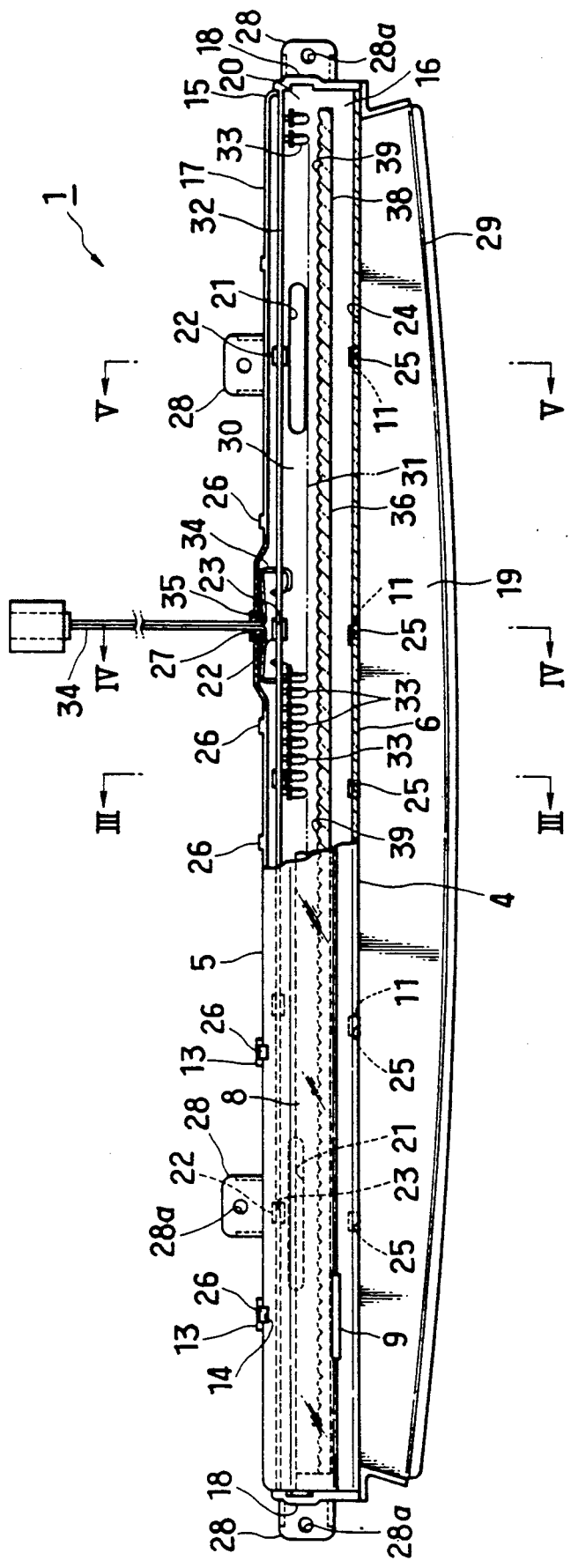
FIG. 1 is a partially broken plan view of an automobile signal lamp according to a first embodiment of the present invention.
Figure 2:
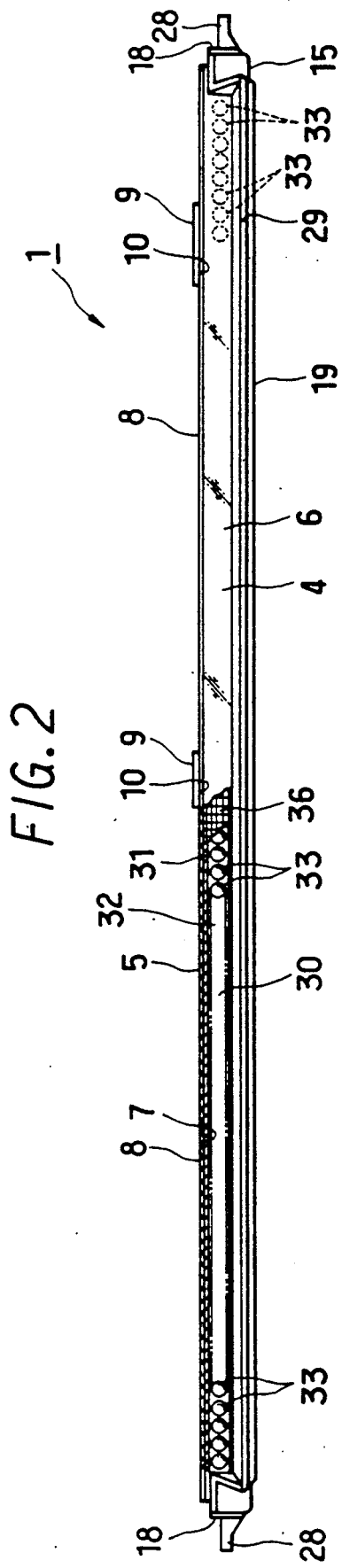
FIG. 2 is a partially broken front view of the signal lamp of FIG. 1.

FIG. 1 through FIG. 6 show an automobile signal lamp 1 according to a first embodiment of the present invention.

Outline

The signal lamp 1 shown in the embodiment is a signal lamp of the type so-called high mount stop lamp mounted on the inside of a rear window 2 of an automobile.

Shown at numeral 3 is a part of a rear housing, such as the rear parcel shelf, extending generally horizontally and contacting with the inside of the lower portion of the rear window 2. The signal lamp 1 is mounted on the lower side of the rear housing 3.

Lens Member

Shown at 4 is a lens member die-formed of a transparent synthetic resin material. In the embodiment, the lamp 1 is used as a stop lamp, and thus the lens 4 is formed of a red colored synthetic resin material.

The lens member 4 has an elongated form in the left and right directions, and comprises a top plate portion 5 and a front surface portion 6 formed integrally with the top plate portion 5 and depending downward from the front edge thereof.

The central portion in the for and aft directions of the top plate portion 5 projects slightly upward so as to define on the inside an elongated recess 7 extending in the left and right directions and, on the outside an elongated projection 8 extending in the left and right directions.

A plurality of depending pieces 9, 9 . . . are formed on the upper front edge of the projection 8 to project forward and are spaced from each other in the left and right directions. These depending pieces 9, 9 . . . respectively define between the front surface of the projection 8 and the upper surface of the top plate portion 5 retaining grooves 10, 10 . . . respectively.

Figure 3:
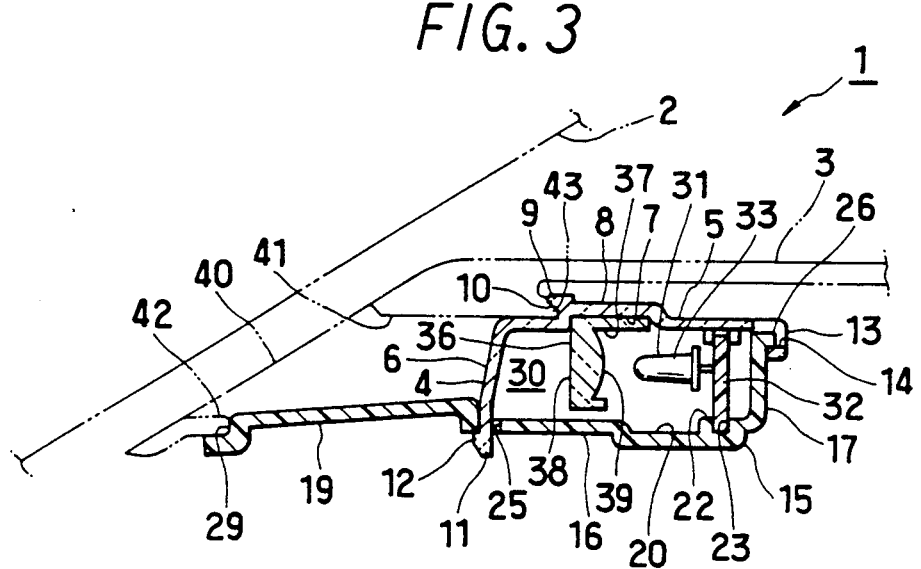
FIG. 3 is an enlarged sectional view taken generally along line III—III of FIG. 1.
Figure 4:
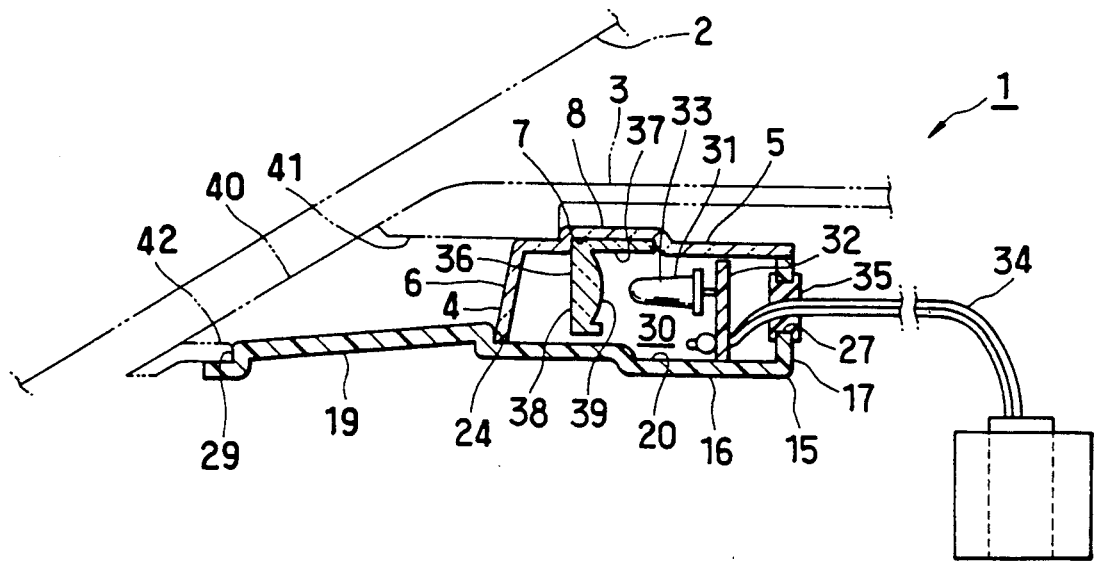
FIG. 4 is an enlarged sectional view taken generally along line IV—IV of FIG. 1.
Figure 5:
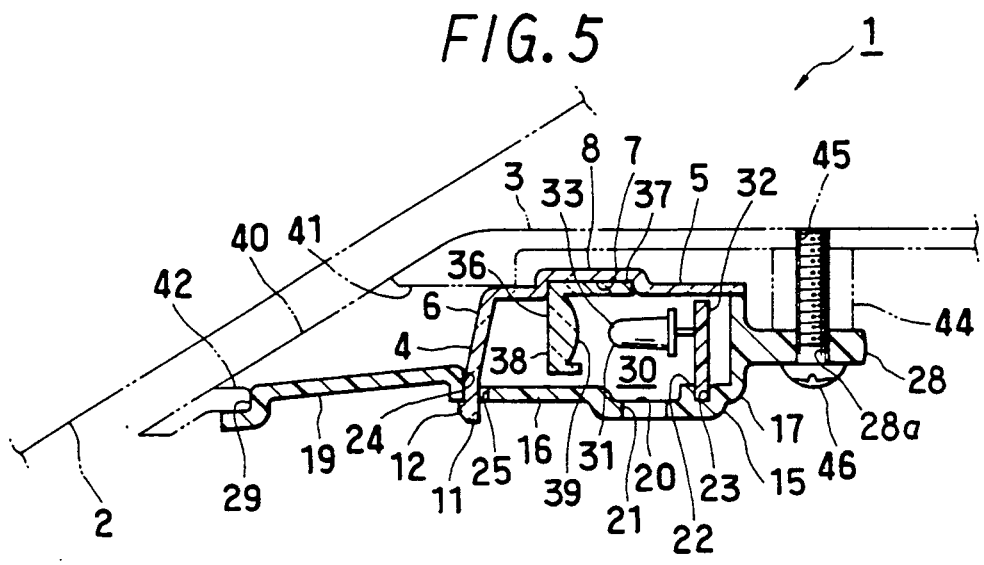
FIG. 5 is an enlarged sectional view taken generally along line V—V of FIG. 1.
Figure 6:
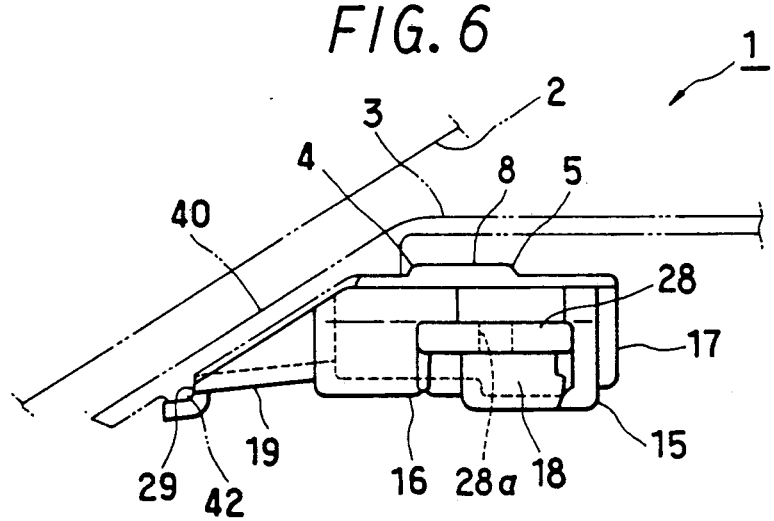
FIG. 6 is an enlarged side view of the lamp of FIG. 1.

Shown at 11, 11 . . . are pawl pieces projecting from the lower end of the front surface portion 6 respectively in spaced relationship and have respectively on the front surfaces pawl members 12, 12 . . . as shown in FIGS. 3 and 5.

Figure 7:
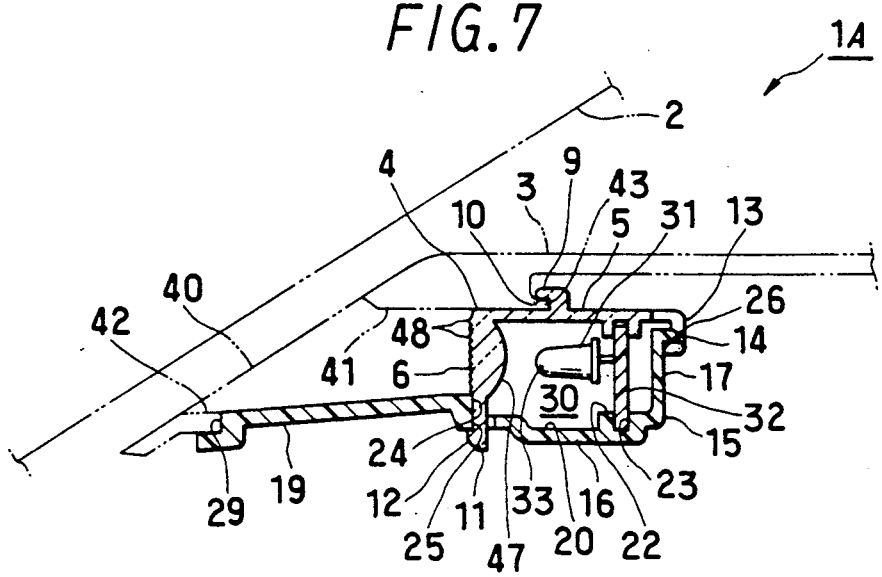
FIG. 7 is an enlarged sectional view of an automobile signal lamp according to a second embodiment.

Shown at 13, 13 . . . are receptacle pieces projecting in the lower direction from the rear edge of the top plate portion 5 in spaced relationship, and have respectively retaining openings 14, 14 . . . as shown in FIGS. 3 and 7.

Body Member

Shown at numeral 15 is a body member formed preferably of an opaque synthetic resin material. The body member 15 has an elongated form extending in the left and right directions corresponding to the lens member 4, and has integrally a base plate portion 16, a rear plate portion 17 extending vertically upward from the rear end of the base plate portion 16, side plate portions 18 and 18 respectively extending from opposite side edges of the base plate portion 16 in vertically upward direction with the rear edges thereof being connected to side edges of the rear plate portion 17, and an extended portion 19 extending from the front edge of the base plate portion 16.

The base plate portion 16 is formed into a stepped form in the vertical cross-section such that the front half portion is slightly higher than the rear half portion thereby defining a recess 20 extending in left and right directions. There are provided heat radiating openings 21 and 21 in the rear half portion of the base plate portion 16.

A plurality of projections 22, 22 . . . are formed on the upper surface of the recess 20 so as to define retaining grooves 23, 23 . . . respectively.

A rear facing step 24 is formed between the base plate portion 16 and the extended portion 19, and there are formed in a spaced relationship a plurality of retaining openings 25, 25 . . . in the base plate portion 16 adjacent to the step 24 and corresponding to the pawl pieces 11, 11 . . . of the lens member 4.

There are provided a plurality of pawl members 26, 26 . . . , in a spaced relationship and corresponding to the retaining openings 14, 14 . . . in the lens member 4, on the upper edge of the rear surface of the rear plate portion 17 to project in the rear direction respectively.

An opening 27 for passing therethrough electric wires is formed in generally central portion of the rear plate portion 17.

A plurality of mounting pieces 28, 28 . . . are formed on the rear plate portion to project in the rear direction, and on respective side plate portions 18 and 18 to project in the outward directions in the side directions as shown clearly in FIG. 1. A mounting opening 28a is formed in each of the mounting pieces 28, 28 . . . .

The front edge of the extending portion 19 has, in the plan view, a convex form such that the central portion projects forward as compared with side edge portions. An engaging step 29 is formed in the upper surface of the front edge of the extending portion 19 as shown in FIGS. 3 through 6.

When the lens member 4 is located on the body member 15 such that the the pawl pieces 11, 11 . . . of the lens member 4 are located to correspond the retaining openings 25, 25 . . . in the base plate portion 16 of the body member 15 and the pawl members 26, 26 . . . of the body member 15 are located to correspond respectively to the retaining openings 14, 14 . . . of the lens member 4. At this condition, the lens member 4 and the body member 15 are pushed toward each other or the lens member 4 is pushed downward relative to the body member 15, then, the rear ends of the pawl pieces 11, 11 . . . deflect in the rear direction, the receptacle pieces 13, 13 . . . of the lens member 4 deflect in the rear direction, and the upper ends of the rear plate portion 17 of the body member 15 deflect in the front direction so that the rear ends of respective pawl pieces 11, 11 . . . of the lens member 4 pass through the the retaining openings 25, 25 . . . in the body member 15 with the pawl members 12, 12 . . . engaging with the front lower edges of the openings 25, 25 . . . , and the pawl members 26, 26 . . . of the body member 15 engaging with the lower edges of the retaining openings 14, 14 . . . of the lens member 4, thus, the lens member 4 and the body member 15 are connected together, and a closed space 30 of elongated shape in the left and right directions is formed therebetween.

Light Source Member

Shown at numeral 31 is a light source member disposed in the space 30.

The light source member 31 includes a printed circuit board 32 of an elongated strip-like configuration, a plurality of light emitting diodes 33, 33 . . . supported on the front surface of the circuit board 32, and electric cords 34 and 34 connected to the circuit board 32 for supplying electric power to respective light emitting diodes 33, 33 . . . .

The light source member 31 is supported in the space 30 with the lower edge of the printed circuit board 32 fitting in and supported by the supporting grooves 23, 23 . . . formed in the inner surface of the base plate portion 16 of the body member 15, and the upper edge of the printed circuit board 32 abutting with and supported by the inner surface of the top plate portion of the lens member 4, whereby the light source member 31 is disposed in the space 30 and clamped between the base plate portion 16 of the body member 15 and the top plate portion 5 of the lens member 4.

Shown at numeral 35 is a grommet formed of a rubber material and mounted in the opening 27 in the rear plate portion 17 of the body member 15 for supporting the electric wires 34 and 34 in passing through the opening 27.

Inner Lens

Shown at 36 is an inner lens formed of a transparent synthetic resin material, and has in the vertical cross-section a generally inverted L-shaped form consisting of a generally horizontally extending mounting portion 37 and a generally vertical integral lens portion 38.

The width of the mounting portion 37 in the fore and aft directions corresponds to that of the recess 7 in the top plate portion 7 in the lens member 4, and the mounting portion 37 is fitted in the recess 5.

The lens portion 38 is disposed between the light emitting diodes 33, 33 . . . and the front surface portion 6 of the lens member 4, and the rear face thereof or the surface facing the light emitting diodes 33, 33 . . . is formed to have a plurality of converging lens elements 39, 39 . . . . The lower edge of the lens portion 38 abuts with the inner or upper surface of the base plate portion 16 of the body member 15, although in FIGS. 3, 4 and 5 there is shown a clearance therebetween.

The inner lens 36 is clamped and retained between the top plate portion 5 of the lens member 4 and the base plate portion 16 of the body member 15.

The converging lens elements 39, 39 . . . of the inner lens 36 act to converge the light emitted from the light emitting diodes 33, 33 . . . so as to uniformly converge on the inner surface of the front surface portion 6 of the lens member 4, and the light is diverged to some extent by light diverging elements formed on the inner surface of the front surface portion 6 of the lens member 4 (not shown), whereby it can reliably be observed from a certain extent of the rear direction whether the signal lamp is lit or not.

Mounting

Shown at numeral 40 is the rear surface portion of the rear housing 3, which is located along the inner surface of the rear window 2. A window 41 elongated in the left and right directions is formed in the rear surface portion 40. A ridge 42 is formed on the lower edge of the window 41 to project inward, and a plurality of retaining projections 43, 43 . . . projecting in the inner direction are formed on the rear housing 3 at the locations somewhat inward of the upper edge of the window 41 so as to cooperate with the retaining grooves 10, 10 . . . which are defined by the depending pieces 9, 9 . . . of the lens member 4 in mounting the signal lamp 1 on the rear housing 3.

Shown at numeral 44 in FIG. 5 is a boss integrally formed on the inner surface of the rear housing 3 and screw-threaded bore 45 is formed therein. It will be understood that there are provided preferably two or more bosses 44.

In mounting the automobile signal lamp 1 on the rear housing 3, the retaining grooves 10, 10 . . . formed in the top plate portion 5 of the lens member 4 are fitted with the retaining projections 43, 43 . . . of the rear housing 3, and the engaging step 29 formed on the front end of the extending portion 19 of the body member 15 is fitted with the inner edge of the projecting ridge 42 on the rear surface portion 40 of the rear housing 3. Then, the mounting pieces 28, 28 . . . of the signal lamp 1 abut with the lower surfaces of respective bosses 44, 44 . . . of the rear housing 3 with the mounting holes 28a, 28a . . . of the mounting pieces 28, 28 . . . aligning with the threaded bores 45, 45 . . . in the bosses 44, 44 . . . .

Then, the mounting pieces 28, 28 . . . of the signal lamp 1 are secured to the bosses 44, 44 . . . of the rear housing 3 by utilizing mounting screws 46, 46 . . . .

Second Embodiment

FIG. 7 shows an automobile signal lamp 1A according to the second embodiment of the present invention.

The signal lamp 1A shown in FIG. 7 differs from the signal lamp 1 in that the inner lens 36 is omitted and, accordingly, the same reference numerals are applied to parts corresponding to that of the first embodiment, and detailed description therefor is omitted.

A plurality of light converging lens elements 47, 47 . . . (only one is shown in FIG. 7) are formed on the inner surface of the front surface portion 6 of the lens member 4 and, on the outer surface of the front surface portion 6, a plurality of light diverging lens elements 48, 48 . . . are formed integrally.

Advantages of the Invention

As described heretofore, the automobile signal lamp of the present invention is mounted on the inside of a rear window of the vehicle and consists of a lens member, a body member and a light source member disposed in a space defined between the lens member and the body member, wherein the lens member and the body member are formed to have connecting means which cooperate in connecting the lens member with the body member.

Thus, according to the invention, it is not required to provide screws and nuts or a bonding agent or the like for connecting the lens member and the body member, it is not required to provide a bulky and expensive apparatus, and costs and labor can be saved substantially.

In the above embodiments, the light source is a plurality of light emitting diodes mounted on a printed circuit board but, it will be understood that various types of light sources may be utilized.

The heat radiating openings 21 and 21 can effectively dissipate the heat in the space 30, but such openings may be omitted.

It will be understood that numerous modifications and changes may be devised by those skilled in the art. It is intended that the appended claims will cover such modifications as fall within the spirit and scope of the present invention.

We claim:

1. An automobile high-mount stop lamp for mounting on the inside of a rear window of an automobile, comprising:

an outer lens member having a top plate portion and a front surface portion formed integrally with said top plate portion and depending downward from a front edge of said top plate portion, a plurality of spaced pawl pieces projecting from a lower end of said front surface portion, and a plurality of downward projecting receptacle pieces disposed along a rear edge of said top plate portion having retaining openings formed therein, said top plate portion, said front surface portion, said pawl pieces and said receptacle pieces being molded integrally with one another;

a body member having a base plate portion, a rear plate portion extending vertically upward from a rear end of said base plate portion, side plate portions extending vertically upward from opposite side edges of said base plate portions and connected to respective side edges of said rear plate portion, an extended portion extending forward from a front edge of said base portion with a rear facing step being formed between said base plate portion and said extended portion, a plurality of spaced retaining openings being formed in said base plate portion adjacent said step each receiving a respective one of said pawl pieces of said outer lens member, a plurality of spaced pawl members formed along an upper edge of a rear surface of said rear plate projecting rearward and with each received in a respective one of said retaining openings of said lens member, and a plurality of rearward projecting mounting pieces formed on said rear plate portion, said base plate portion, said rear plate portion, said side plate portions, said extended portion, and said pawl members being molded integrally with one another; and a light source member disposed in a space between said outer lens member and said base member.

2. The automobile high-mount stop lamp of claim 1, wherein said outer lens member further comprises: an elongated projection extending leftward and rightward along said top plate portion, and a plurality of forward projecting depending pieces formed on an upper front edge of said elongated projection spaced from one another along said upper front edge and defining retaining grooves between a front surface of said projection and an upper surface of said top plate portion forward of said elongated projection.

3. The automobile high-mount stop light of claim 2, wherein said receptacle pieces project downward and have retaining openings formed therein, and said spaced pawl members are formed along an upper edge of a rear surface of said rear plate, project rearward and are received in respective ones of said retaining openings of said receptacle pieces.

4. The automobile high-mount stop lamp of claim 3, wherein said base plate portion of said body member is formed in a stepped form such that a front portion thereof is slightly higher than a rear portion thereof so as to define a recess in said rear portion, a plurality of projections being formed on an upper surface of said recess defining retaining grooves for mounting said light source member.

5. The automobile high-mount stop lamp of claim 1, wherein a plurality of heat radiating openings are formed in said rear half portion of said base plate portion.

6. The automobile high-mount stop lamp of claim 1, wherein an engaging step is formed in a front edge of said extended portion.

7. The automobile high-mount stop lamp of claim 1, wherein a plurality of light-converging lens elements are formed in said front surface portion of said outer lens member.

8. The automobile high-mount stop lamp of claim 2, further comprising an inner lens member, said inner lens member having a generally L shape and having a generally horizontally extending mounting portion and a generally vertical lens portion formed integrally with said mounting portion, said mounting portion being fitted in a recess beneath said projection of said outer lens member.

9. The automobile high-mount stop lamp of claim 8, wherein a lower end of said lens portion of said inner lens member abuts an upper surface of said front portion of said base portion of said body member.

10. The automobile high-mount stop lamp of claim 8, wherein a lower end of said lens portion of said inner lens member is spaced apart from an upper surface of said front portion of said base portion of said body member.

11. The automobile high-mount stop lamp of claim 1, wherein a lower end of said lens portion of said inner lens member abuts an upper surface of said base portion of said body member.

12. The automobile high-mount stop lamp of claim 3, wherein said mounting pieces each comprise a boss portion having a bore formed therein for receiving a screw.

* * * * *